United States Patent
Saito et al.

(10) Patent No.: US 12,479,051 B2
(45) Date of Patent: Nov. 25, 2025

(54) FLUX AND SOLDER PASTE

(71) Applicant: SENJU METAL INDUSTRY CO., LTD., Tokyo (JP)

(72) Inventors: Ryo Saito, Tokyo (JP); Tomoko Nagai, Tokyo (JP); Tetsu Takemasa, Tokyo (JP); Kazuyori Takagi, Tokyo (JP); Yutaka Hashimoto, Tokyo (JP); Nanako Miyagi, Tokyo (JP); Mutsuki Kaneko, Tokyo (JP); Megumi Hayakawa, Tokyo (JP); Tsuyoshi Masaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/996,263

(22) PCT Filed: Jul. 21, 2023

(86) PCT No.: PCT/JP2023/026796
§ 371 (c)(1),
(2) Date: Jan. 17, 2025

(87) PCT Pub. No.: WO2024/019147
PCT Pub. Date: Jan. 25, 2024

(65) Prior Publication Data
US 2025/0256362 A1    Aug. 14, 2025

(30) Foreign Application Priority Data
Jul. 22, 2022   (JP) ................. 2022-117441

(51) Int. Cl.
| | | |
|---|---|---|
| B23K 35/362 | (2006.01) | |
| B23K 35/02 | (2006.01) | |
| B23K 35/26 | (2006.01) | |
| B23K 35/36 | (2006.01) | |
| C22C 13/00 | (2006.01) | |

(52) U.S. Cl.
CPC .......... *B23K 35/362* (2013.01); *B23K 35/025* (2013.01); *B23K 35/262* (2013.01); *B23K 35/3613* (2013.01); *B23K 35/3616* (2013.01); *B23K 35/3618* (2013.01); *C22C 13/00* (2013.01)

(58) Field of Classification Search
CPC .................................................. B23K 35/362
See application file for complete search history.

(56) References Cited

U.S. PATENT DOCUMENTS

| | | | |
|---|---|---|---|
| 2,901,387 | A | 8/1959 | Forker et al. |
| 2003/0168123 | A1 | 9/2003 | Wada et al. |

FOREIGN PATENT DOCUMENTS

| | | | | |
|---|---|---|---|---|
| CN | 106514057 | A | 3/2017 | |
| CN | 111655421 | A | 9/2020 | |
| CN | 111670086 | A | 9/2020 | |
| CN | 112867583 | A | 5/2021 | |
| CN | 113423850 | A | 9/2021 | |
| CN | 114378476 | A | 4/2022 | |
| JP | 52128859 | A | 10/1977 | |
| JP | 04094891 | A | 3/1992 | |
| JP | 2002361484 | A | 12/2002 | |
| JP | 2003001487 | A | 1/2003 | |
| JP | 2013126671 | A | 6/2013 | |
| JP | 2014117737 | A | 6/2014 | |
| JP | 2020011283 | A * | 1/2020 | ......... B23K 35/3612 |
| JP | 2020066031 | A | 4/2020 | |
| KR | 20200077603 | A | 6/2020 | |
| MY | 199516 | A * | 11/2023 | ......... B23K 35/0222 |
| TW | 202202263 | A | 1/2022 | |

OTHER PUBLICATIONS

International Search Report for Application No. PCT/JP2023/026796, mailed Oct. 17, 2023 (4 pages).
Taiwan Office Action for Application No. 112127189, mailed Mar. 8, 2024 (14 pages).
Korean Office Action in Patent Application No. 10-2025-7001816 with English Translation, mailed Apr. 30, 2025, (10 pages).
Office Action in Chinese Patent Application No. 202380054670.9 with English Translation, mailed May 17, 2025, (16 pages).
European Search report in Patent Application No. 23843070.6, dated Sep. 8, 2025, (5 pages).

* cited by examiner

*Primary Examiner* — Jophy S. Koshy
(74) *Attorney, Agent, or Firm* — NIXON PEABODY LLP; Jeffrey L. Costellia

(57) ABSTRACT

A flux containing rosin, a solvent, a thixotropic agent, an amine hydroiodide, and an activator (provided that the amine hydroiodide is excluded), in which the amine hydroiodide includes a heteroalicyclic amine hydroiodide, is provided in the present invention. As the heteroalicyclic amine hydroiodide, at least one selected from the group consisting of piperidine hydroiodide and pipecholine hydroiodide is preferable. According to such flux, the generation of voids during soldering can be further suppressed.

10 Claims, 1 Drawing Sheet

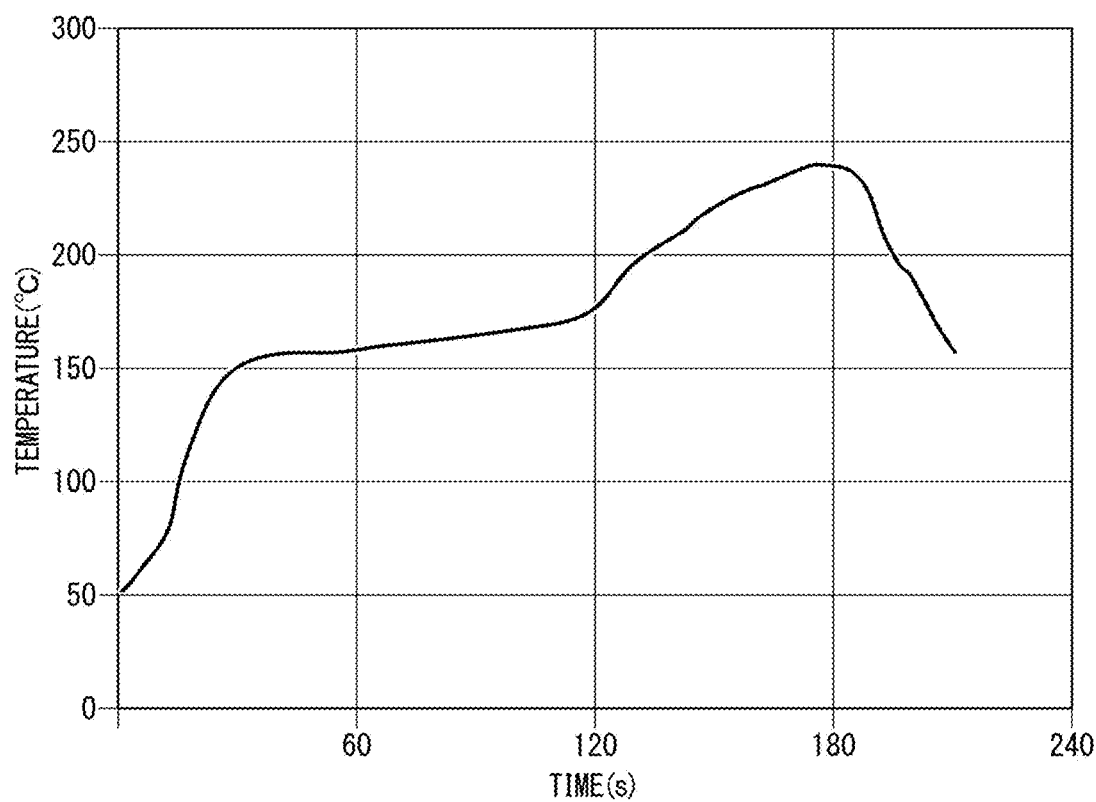

FLUX AND SOLDER PASTE

TECHNICAL FIELD

The present invention relates to a flux and a solder paste.

Priority is claimed on Japanese Patent Application No. 2022-117441, filed Jul. 22, 2022, the content of which is incorporated herein by reference.

BACKGROUND ART

Fixing of components to a board and electrical connection of components to a board are generally performed by soldering. In soldering, a flux, a solder powder, and a solder paste in which a flux and a solder powder are mixed are used.

A flux has the effect of chemically removing metal oxides present on the metal surface of an object to be joined, which is a soldering target, and on a solder, thereby enabling the movement of metal elements at the boundary between the metal surface of the object to be joined and the solder. Therefore, by performing soldering using the flux, an intermetallic compound is formed between the metal surface of the object to be joined and the solder. Thereby, strong joining can be obtained.

In the soldering using a solder paste, the solder paste is first printed on a board, components are mounted thereon, and the board on which the components are mounted is heated in a heating furnace called a reflow furnace. As a result, the solder powder contained in the solder paste is melted, and the components are soldered to the board.

The formulation components of the flux are appropriately selected depending on the type of solder or the metal species of the surface of the object to be joined. For example, in examples of Patent Document 1 proposes a solder paste using a flux containing a base resin, a solvent, a thixotropic agent, an activator (amine hydrobromide or an organic monocarboxylic acid), an antioxidant, and a rust inhibitor for a specific solder alloy powder.

CITATION LIST

Patent Document

Patent Document 1: Japanese Unexamined Patent Application, First Publication No. 2002-361484

SUMMARY OF INVENTION

Technical Problem

In recent years, miniaturized components such as a quad flat non-leaded package (QFN) have been used. Since the QFN does not have leads around the package and has an exposed surface of a lead frame and an electrode terminal on a rear surface of the package, in a case where the QFN is soldered to a board, the rear surface of the QFN and a surface of the board are joined to each other with solder paste.

In a case where the exposed surface of the lead frame and the electrode terminal on the package rear surface are soldered to the board, it is difficult to sufficiently suppress the generation of voids with the solder paste in the related art.

Therefore, an object of the present invention is to provide a flux capable of further suppressing the generation of voids during soldering, and a solder paste using the flux.

Solution to Problem

In order to achieve the above-described object, the present invention adopts the following configurations.

[1] A flux containing rosin, a solvent, a thixotropic agent, an amine hydroiodide, and an activator (provided that the amine hydroiodide is excluded), in which the amine hydroiodide includes a heteroalicyclic amine hydroiodide, is provided in the present invention.

[2] The flux according to [1], in which the heteroalicyclic amine hydroiodide is at least one selected from the group consisting of a piperidine hydroiodide and a pipecholine hydroiodide.

[3] The flux according to [1] or [2], in which a content of the heteroalicyclic amine hydroiodide is 0.01% by mass or more and 1.5% by mass or less with respect to a total mass (100% by mass) of the flux.

[4] The flux according to any one of [1] to [3], in which as the solvent, a solvent (S1) having a boiling point of 250° C. or higher and a solvent (S3) having a boiling point of 220° C. or lower are used in combination.

[5] The flux according to [4], in which a ratio of the solvent (S1) to the solvent (S3) is 50/50 or more and 85/15 or less in a mass ratio represented by solvent (S1)/solvent (S3).

[6] The flux according to any one of [1] to [5], further containing a sulfur-containing compound.

[7] The flux according to any one of [1] to [6], in which the activator includes a dicarboxylic acid represented by General Formula (A0).

[Chemical Formula 1]

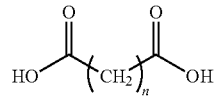

(A0)

[In the formula, n is an integer of 0 to 8.]

[8] The flux according to any one of [1] to [7], in which the activator includes a triazole compound.

[9] A solder paste containing a solder alloy powder and the flux according to any one of [1] to [8].

Advantageous Effects of Invention

According to the present invention, it is possible to provide a flux capable of further suppressing the generation of voids during soldering, and a solder paste using the flux.

BRIEF DESCRIPTION OF DRAWINGS

FIG. 1 A diagram showing a reflow profile in the evaluation of [Effect of suppressing void generation] in the present example.

DESCRIPTION OF EMBODIMENTS (Flux)

The flux of the present embodiment contains rosin, a solvent, a thixotropic agent, an amine hydroiodide, and an activator (provided that the amine hydroiodide is excluded). The amine hydroiodide includes a heteroalicyclic amine hydroiodide.

<Rosin>

Examples of the rosin include raw material rosin such as gum rosin, wood rosin, and tall oil rosin, and derivatives obtained from the raw material rosin, and the like. Examples of the derivatives include, purified rosin, hydrogenated rosin, disproportionated rosin, polymerized rosin, acid-modified rosin, acid-modified hydrogenated rosin, phenol-modified rosin, and α,β-unsaturated carboxylic acid-modified products (acrylated rosin, maleated rosin, fumarated rosin, and the like), and purified products, hydrides, and disproportionated products of the polymerized rosin, purified products, hydrides, and disproportionated products of the α,β-unsaturated carboxylic acid-modified products, and the like.

For the rosin, one type may be used alone, or two or more types may be mixed and used.

As the rosin, among these, it is preferable to use at least one type selected from the group consisting of polymerized rosin, acid-modified hydrogenated rosin, and hydrogenated rosin.

As the acid-modified hydrogenated rosin, it is preferable to use an acrylic acid-modified hydrogenated rosin.

Examples of the hydrogenated rosins include hydrogenated natural resins containing a mixture of abietic acid and its isomer, for example, a rosin containing dihydroabietic acid and tetrahydroabietic acid as main components. The term "main component" refers to a component contained in a compound by an amount of 40% by mass or more, among components constituting the compound.

The content of the rosin in the flux according to the present embodiment is preferably 10% by mass or more and 60% by mass or less, more preferably 20% by mass or more and 50% by mass or less, and still more preferably 25% by mass or more and 40% by mass or less with respect to the total mass (100% by mass) of the flux.

<Solvent>

Examples of the solvent include water, an alcohol-based solvent, a glycol ether-based solvent, and terpineols, and the like.

Examples of the alcohol solvents include isopropyl alcohol, 1,2-butanediol, 1,3-butanediol, 1,4-butanediol, 2,3-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanol, 1,4-cyclohexanediol, 1,4-cyclohexanedimethanol, 2,4,7,9-tetramethyl-5-decyne-4,7-diol, 2-hexyl-1-decanol, 2-methyl-2,4-pentanediol (hexylene glycol), octanediol, and the like.

Examples of the glycol ether solvents include diethylene glycol mono-2-ethylhexyl ether, ethylene glycol monophenyl ether, ethylene glycol monobutyl ether (butyl glycol), ethylene glycol monohexyl ether (hexyl glycol), diethylene glycol monohexyl ether (hexyl diglycol), diethylene glycol dibutyl ether, triethylene glycol monobutyl ether, methylpropylene triglycol, triethylene glycol butyl methyl ether, tetraethylene glycol, tetraethylene glycol dimethyl ether, tripropylene glycol-n-butyl ether, and the like.

Examples of the terpineols include α-terpineol, β-terpineol, γ-terpineol, terpineol mixtures (that is, mixtures containing β-terpineol or γ-terpineol with (α-terpineol as a main component), and the like.

Examples of other solvents include dioctyl sebacate (DOS) and liquid paraffin.

For the solvent, one type may be used alone, or two or more types may be mixed and used.

In the flux according to the present embodiment, from the viewpoint of suppressing the generation of voids during soldering, as the solvent, solvents having different boiling points are preferably used in combination. Among these, as the solvent, a solvent (S1) having a boiling point of 250° C. or higher and a solvent (S3) having a boiling point of 220° C. or lower are preferably used in combination. By using the solvent (S1) and the solvent (S3) in combination, the generation of voids during soldering can be further suppressed.

In the present specification, the "boiling point of a solvent" means a temperature of the solvent in a case where the saturated vapor pressure of the solvent of interest is equal to 1 atm.

Hereinafter, the solvent having a boiling point of 250° C. or higher is also referred to as a component (S1), and the solvent having a boiling point of 220° C. or lower is also referred to as a component (S3). In addition, a solvent having a boiling point of higher than 220° C. and lower than 250° C. is referred to as a component (S2).

<<Solvent (S1) Having Boiling Point of 250° C. or Higher>>

Examples of the component (S1) include diethylene glycol mono-2-ethylhexyl ether (boiling point of 272° C.), diethylene glycol monohexyl ether (hexyl diglycol) (boiling point of 258° C.), diethylene glycol dibutyl ether (boiling point of 256° C.), triethylene glycol monobutyl ether (boiling point of 278° C.), triethylene glycol butylmethyl ether (boiling point of 261° C.), tetraethylene glycol dimethyl ether (boiling point of 275° C.), and the like.

<<Solvent (S2) Having Boiling Point of Higher than 220° C. and Lower than 250° C.>>

Examples of the component (S2) include 1,4-butanediol (boiling point of 228° C.), phenyl glycol (boiling point of 237° C.), butyl carbitol (boiling point of 231° C.), tripropylene glycol monomethyl ether (boiling point of 243° C.), and the like.

<<Solvent (S3) Having Boiling Point of 220° C. or Lower>>

Examples of the component (S3) include 1,3-butanediol (boiling point of 203° C.), 1,2-butanediol (boiling point of 194° C.), 2-methyl-2,4-pentanediol (hexylene glycol) (boiling point of 198° C.), ethylene glycol monohexyl ether (hexyl glycol) (boiling point of 208° C.), 2,2-dimethyl-1,3-propanediol (boiling point of 210° C.), 2,5-dimethyl-2,5-hexanediol (boiling point of 215° C.), 2,5-dimethyl-3-hexyne-2,5-diol (boiling point of 206° C.), and α-terpineol (boiling point of 218° C.) (all of which are solvents having a boiling point of 190° C. or higher and 220° C. or lower (these solvent are also referred to as a "solvent (S31)" or a "component (S31)")); ethylene glycol monobutyl ether (butyl glycol) (boiling point of 171° C.), 2,3-butanediol (boiling point of 183° C.), 2,3-dimethyl-2,3-butanediol (boiling point of 174° C.), and 1-ethynyl-1-cyclohexanol (boiling point of 180° C.) (all of which are solvents having a boiling point of 160° C. or higher and lower than 190° C. (these solvent are also referred to as a "solvent (S32)" or a "(S32) component")); and the like.

As the form of the solvents having different boiling points, a combination of the above-described component (S1) and component (S3) is preferable, and it is particularly preferable to use component (S1) and component (S31) in combination since the generation of voids during soldering is easily suppressed, the boiling point is not too low, and the ratio of the change in viscosity with time in a case of being made into a solder paste is low.

In a case where the component (S1) and the component (S3) are used in combination, from the viewpoint of easily suppressing the generation of voids during soldering, a ratio of the component (S1) to the component (S3) is preferably 50/50 or more and 85/15 or less in a mass ratio represented by solvent (S1)/solvent (S3). Furthermore, from the viewpoint of easily suppressing a proportion of change in viscosity with time in a case of being made into a solder paste, in the mass ratio of the solvent (S1)/the solvent (S3), 55/45 or more and 85/15 or less is preferable and 60/40 or more and 85/15 or less is more preferable.

The total content of the solvent is the remainder in the flux.

For example, the total content of the solvent in the flux according to the present embodiment is preferably 25% by mass or more and 60% by mass or less, more preferably 30% by mass or more and 50% by mass or less, and still more preferably 35% by mass or more and 45% by mass or less with respect to the total mass (100% by mass) of the flux.

<Thixotropic Agent>

Examples of the thixotropic agent include an ester-based thixotropic agent, an amide-based thixotropic agent, a sorbitol-based thixotropic agent, and the like.

Examples of the ester-based thixotropic agent include ester compounds, and specific examples thereof include hydrogenated castor oil, ethyl myristate, and the like.

Examples of the amide-based thixotropic agent include monoamides, bisamides, and polyamides.

Examples of the monoamides include lauric acid amide, palmitic acid amide, stearic acid amide, behenic acid amide, hydroxystearic acid amide, saturated fatty acid amide, oleic acid amide, erucic acid amide, unsaturated fatty acid amide, 4-methylbenzamide (β-toluamide), β-toluenemethanamide, aromatic amide, hexamethylene hydroxystearic amide, substituted amide, methylolstearic amide, methylolamide, and fatty acid ester amide.

Examples of the bisamides include ethylenebis fatty acid (fatty acid carbon number C6-24) amide, ethylenebis hydroxy fatty acid (fatty acid carbon number C6-24) amide, hexamethylenebis fatty acid (fatty acid carbon number C6-24) amide, hexamethylenebis hydroxy fatty acid (fatty acid carbon number C6-24) amide, and aromatic bisamide. Examples of fatty acids that are raw materials for the bisamides include stearic acid (carbon number C18), oleic acid (carbon number C18), and lauric acid (carbon number C12).

Examples of the polyamides include polyamides such as saturated fatty acid polyamides, unsaturated fatty acid polyamides, aromatic polyamides, 1,2,3-propanetricarboxylic acid tris(2-methylcyclohexylamide), cyclic amide oligomers, and acyclic amide oligomers.

Examples of the above-mentioned cyclic amide oligomers include an amide oligomer in which a dicarboxylic acid and a diamine are cyclically polycondensed, an amide oligomer in which a tricarboxylic acid and a diamine are cyclically polycondensed, an amide oligomer in which a dicarboxylic acid and a triamine are cyclically polycondensed, an amide oligomer in which a tricarboxylic acid and a triamine are cyclically polycondensed, an amide oligomer in which a dicarboxylic acid and a tricarboxylic acid, and a diamine are cyclically polycondensed, an amide oligomer in which a dicarboxylic acid and a tricarboxylic acid, and a triamine are cyclically polycondensed, an amide oligomer in which a dicarboxylic acid, and a diamine and a triamine are cyclically polycondensed, an amide oligomer in which a tricarboxylic acid, and a diamine and a triamine are cyclically polycondensed, and an amide oligomer in which a dicarboxylic acid and a tricarboxylic acid, and a diamine and a triamine are cyclically polycondensed.

Examples of the above-mentioned acyclic amide oligomers include an amide oligomer in which a monocarboxylic acid, and a diamine and/or a triamine are acyclically polycondensed, an amide oligomer in which a dicarboxylic acid and/or a tricarboxylic acid, and a monoamine are acyclically polycondensed, and the like. In the case of an amide oligomer containing a monocarboxylic acid or a monoamine, the monocarboxylic acid and the monoamine function as terminal molecules, thereby resulting in an acyclic amide oligomer having a reduced molecular weight. In addition, when the acyclic amide oligomer is an amide compound in which a dicarboxylic acid and/or a tricarboxylic acid, and a diamine and/or a triamine are acyclically polycondensed, it is an acyclic polymer-based amide polymer. Furthermore, the acyclic amide oligomer also includes an amide oligomer in which a monocarboxylic acid and a monoamine are acyclically condensed.

Examples of the sorbitol-based thixotropic agent include dibenzylidene-D-sorbitol, bis(4-methylbenzylidene)-D-sorbitol, (D-)sorbitol, monobenzylidene(-D-)sorbitol, and mono(4-methylbenzylidene)-(D-)sorbitol, and the like.

For the thixotropic agent, one type may be used alone, or two or more types may be mixed and used.

The thixotropic agent contained in the flux according to the present embodiment is preferably at least one type selected from the group consisting of an ester-based thixotropic agent and an amide-based thixotropic agent, more preferably contains at least an amide-based thixotropic agent, and is still more preferably a combination of an ester-based thixotropic agent and an amide-based thixotropic agent.

As the ester-based thixotropic agent, a hydrogenated castor oil is preferable.

As the amide-based thixotropic agent, polyamide is preferable.

The content of the thixotropic agent in the flux according to the present embodiment is preferably 2% by mass or more and 20% by mass or less, more preferably 5% by mass or more and 15% by mass or less, and still more preferably 5% by mass or more and 10% by mass or less with respect to the total mass (100% by mass) of the flux.

<Amine Hydroiodide>

In the flux according to the present embodiment, an amine hydroiodide containing a heteroalicyclic amine hydroiodide is used. The heteroalicyclic amine hydroiodide is a compound obtained by reacting a heteroalicyclic amine with hydrogen iodide.

In the heteroalicyclic amine hydroiodide, the heteroalicyclic amine is preferably a heteroalicyclic amine having a 6-membered ring structure, suitable examples thereof include piperidine and pipecholine among them, and piperidine and 2-pipecholine are particularly preferable.

As the heteroalicyclic amine hydroiodide, at least one selected from the group consisting of piperidine hydroiodide and pipecholine hydroiodide is preferably used, and at least one selected from the group consisting of piperidine hydroiodide and 2-pipecholine hydroiodide is more preferably used.

The content of the heteroalicyclic amine hydroiodide in the flux according to the present embodiment is preferably 0.01% by mass or more and 1.5% by mass or less, more preferably 0.05% by mass or more and 1.25% by mass or less, still more preferably 0.1% by mass or more and 1% by mass or less, and particularly preferably 0.1% by mass or more and 0.9% by mass or less with respect to the total mass (100% by mass) of the flux.

In a case where the content of the heteroalicyclic amine hydroiodide is equal to or more than the lower limit value of the above-described preferred range, the generation of voids during soldering is easily suppressed, and in a case where the content of the heteroalicyclic amine hydroiodide is equal to or less than the upper limit value of the above-described preferred range, the increase in viscosity of the solder paste with time is easily suppressed.

As the amine hydroiodide, an amine hydroiodide other than the above-described heteroalicyclic amine hydroiodide may be used in combination.

Examples of the amine hydroiodide other than the heteroalicyclic amine hydroiodide include a chain-like amine hydroiodide such as monoethylamine hydroiodide (monoethylamine·HI), triethylamine HI, 1-pentaneamine HI, 2-ethylhexylamine·HI, or diallylamine·HI; an alicyclic amine hydroiodide such as cyclohexylamine·HI; an aromatic amine hydroiodide such as aniline·HI; and a guanidine hydroiodide such as 1,3-diphenylguanidine·HI.

<Activator>

Examples of the activator (provide that the amine hydroiodide is excluded) include a halogen-based activator, an organic acid, an amine, and the like.

<<Halogen-Based Activator>>

Examples of the halogen-based activator include an amine hydrohalide salt other than an amine hydroiodide and an organic halogen compound other than an amine halogen compound.

For the halogen-based activator, one type may be used alone, or two or more types may be mixed and used.

Amine hydrohalide salt other than amine hydroiodide:

The amine hydrohalide salt is a compound obtained by reacting an amine with a hydrogen halide. Examples of the amine here include azoles, guanidines, alkylamine compounds, and amino alcohol compounds, and include amines exemplified in the description of <<Amine>> described later. Examples of the hydrogen halide include hydrides of bromine, chlorine, and fluorine.

Examples of the amine hydrohalide salt include an amine hydrobromide, an amine hydrochloride, and an amine hydrofluoride.

Examples of the amine hydrobromide include 2-pipecholine hydrobromide (2-pipecholine·HBr), piperidine·HBr, diphenylguanidine·HBr, cyclohexylamine·HBr, hexadecylamine·HBr, stearylamine-Br, ethylamine·HBr, 2-ethylhexylamine·HBr, pyridine·HBr, isopropylamine·HBr, diethylamine·HBr, dimethylamine·HBr, rosinamine·HBr, hydrazine hydrate·HBr, trinonylamine·HBr, diethylaniline·HBr, 2-diethylaminoethanol·HBr, diallylamine·HBr, triethylamine·HBr, aniline·HBr, dimethylcyclohexylamine·HBr, rosinamine·HBr, 2-phenylimidazole·HBr, 4-benzylpyridine·HBr, hydrazine monohydrobromide, hydrazine dihydrobromide, ethylenediamine dihydrobromide, and the like.

Examples of the amine hydrochloride include 1,3-diphenylguanidine hydrochloride (1,3-diphenylguanidine HCl), ethylamine·HCl, stearylamine·HCl, diethylaniline·HCl, diethanolamine·HCl, dimethylamine·HCl, 2-ethylhexylamine·HCl, isopropylamine·HCl, cyclohexylamine·HCl, 1,3-diphenylguanidine·HCl, dimethylbenzylamine·HCl, dimethylcyclohexylamine·HCl, 2-diethylaminoethanol·HCl, diallylamine·HCl, diethylamine·HCl, triethylamine·HCl, butylamine·HCl, hexylamine·HCl, n-octylamine·HCl, dodecylamine·HCl, L-glutamic acid·HCl, N-methylmorpholine·HCl, betaine·HCl, pyridine·HCl, hydrazine monohydrochloride, hydrazine dihydrochloride, ammonium chloride, and the like.

Examples of the amine hydrofluoride include 1,3-diphenylguanidine hydrofluoride (1,3-diphenylguanidine-HF), diethylamine-HF, 2-ethylhexylamine-HF, cyclohexylamine-HF, ethylamine-HF, rosinamine-HF, and the like.

Organic halogen compound other than amine hydrohalide salt:

Examples of the organic halogen compound other than the amine hydrohalide salt include halogenated aliphatic compounds having a halogenated aliphatic hydrocarbon group.

The halogenated aliphatic hydrocarbon group refers to one in which a part or all of hydrogen atoms constituting the aliphatic hydrocarbon group are substituted with halogen atoms.

Examples of the halogenated aliphatic compound include halogenated aliphatic alcohols and halogenated heterocyclic compounds.

Examples of the halogenated aliphatic alcohols include 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, trans-2,3-dibromo-2-butene-1,4-diol, and the like.

Examples of the halogenated heterocyclic compound include a compound represented by General Formula (3).

$$R^5-(R^6)_m \qquad (3)$$

$R^5$ represents an m-valent heterocyclic group. $R^6$ represents a halogenated aliphatic hydrocarbon group.

Examples of heterocyclic rings of the m-valent heterocyclic group as $R^5$ include a ring structure in which a part of carbon atoms constituting an aliphatic hydrocarbon ring or an aromatic hydrocarbon ring is substituted with a heteroatom. Examples of the heteroatom in this heterocyclic ring include an oxygen atom, a sulfur atom, a nitrogen atom, and the like. This heterocyclic ring is preferably a 3- to 10-membered ring, and more preferably a 5- to 7-membered ring. Examples of this heterocyclic ring include an isocyanurate ring.

The halogenated aliphatic hydrocarbon group as $R^6$ preferably has 1 to 10 carbon atoms, more preferably 2 to 6 carbon atoms, and further preferably 3 to 5 carbon atoms. In addition, $R^6$ is preferably a brominated aliphatic hydrocarbon group or a chlorinated aliphatic hydrocarbon group, more preferably a brominated aliphatic hydrocarbon group, and further preferably a brominated saturated aliphatic hydrocarbon group.

Specific examples of the halogenated heterocyclic compounds include tris-(2,3-dibromopropyl)isocyanurate, and the like.

In addition, examples of the organic halogen compounds other than the amine hydrohalide salts include halogenated carboxyl compounds and include carboxyl iodide compounds such as 2-iodobenzoic acid, 3-iodobenzoic acid, 2-iodopropionic acid, 5-iodosalicylic acid, 5-iodoanthranilic acid; carboxyl chloride compounds such as 2-chlorobenzoic acid and 3-chloropropionic acid; and brominated carboxyl compounds such as 2,3-dibromopropionic acid, 2,3-dibromosuccinic acid, and 2-bromobenzoic acid.

Alternatively, as the halogen-based activator, for example, a salt obtained by reacting an amine with tetrafluoroboric acid ($HBF_4$), and a complex obtained by reacting an amine with boron trifluoride ($BF_3$) can also be used. Examples of the complex include boron trifluoride piperidine and the like.

The total content of the halogen-based activator in the flux according to the present embodiment is preferably 0.01% by mass or more and 5% by mass or less, more preferably 0.5% by mass or more and 4% by mass or less, and still more preferably 1% by mass or more and 2% by mass or less with respect to the total mass (100% by mass) of the flux.

In a case where the total content of the halogen-based activator is equal to or more than the lower limit value of the above-described preferred range, the void generation during soldering is easily suppressed, and in a case where the total content of the halogen-based activator is equal to or less than the upper limit value of the above-described preferred range, the effect of suppressing the change in viscosity of the solder paste with time is easily enhanced.

<<Organic Acid>>

Examples of the organic acid include a monocarboxylic acid, a dicarboxylic acid, a tricarboxylic acid, a cyanuric acid, a dimer acid, a trimer acid, and the like.

Examples of the monocarboxylic acid include aliphatic monocarboxylic acids such as glycolic acid, thioglycolic acid, propionic acid, 2,2-bis(hydroxymethyl)propionic acid, 2,2-bis(hydroxymethyl)butanoic acid, lauric acid, palmitic acid, stearic acid, oleic acid, linoleic acid, linolenic acid, 12-hydroxystearic acid, and glycine; and aromatic monocarboxylic acids such as benzoic acid, 3-hydroxybenzoic acid, 2,3-dihydroxybenzoic acid, salicylic acid, picolinic acid, β-anisic acid, m-anisic acid, o-anisic acid, parahydroxyphenylacetic acid, and 2-quinoline carboxylic acid.

Examples of the dicarboxylic acid include aliphatic dicarboxylic acids such as oxalic acid, malonic acid, succinic acid, glutaric acid, adipic acid, pimelic acid, suberic acid, azelaic acid, sebacic acid, dodecanedioic acid, eicosanedioic acid, 2,4-diethylglutaric acid, fumaric acid, maleic acid, diglycolic acid, dithiodiglycolic acid, tartaric acid, malic acid, and 1,3-cyclohexanedicarboxylic acid; and aromatic dicarboxylic acids such as phthalic acid, isophthalic acid, terephthalic acid, phenylsuccinic acid, dipicolinic acid, and dibutylanilinediglycolic acid.

Examples of the tricarboxylic acid include citric acid and the like.

Examples of the cyanuric acid include tris(2-carboxyethyl) isocyanurate and the like.

Examples of the dimer acid and the trimer acid include dimer acid which is the reaction product of oleic acid and linoleic acid, trimer acid which is the reaction product of oleic acid and linoleic acid, dimer acid which is the reaction product of acrylic acid, trimer acid which is the reaction product of acrylic acid, dimer acid which is the reaction product of methacrylic acid, trimer acid which is the reaction product of methacrylic acid, dimer acid which is the reaction product of acrylic acid and methacrylic acid, trimer acid which is the reaction product of acrylic acid and methacrylic acid, dimer acid which is the reaction product of oleic acid, trimer acid which is the reaction product of oleic acid, dimer acid which is the reaction product of linoleic acid, trimer acid which is the reaction product of linoleic acid, dimer acid which is the reaction product of linolenic acid, trimer acid which is the reaction product of linolenic acid, dimer acid which is the reaction product of acrylic acid and oleic acid, trimer acid which is the reaction product of acrylic acid and oleic acid, dimer acid which is the reaction product of acrylic acid and linoleic acid, trimer acid which is the reaction product of acrylic acid and linoleic acid, dimer acid which is the reaction product of acrylic acid and linolenic acid, trimer acid which is the reaction product of acrylic acid and linolenic acid, dimer acid which is the reaction product of methacrylic acid and oleic acid, trimer acid which is the reaction product of methacrylic acid and oleic acid, dimer acid which is the reaction product of methacrylic acid and linoleic acid, trimer acid which is the reaction product of methacrylic acid and linoleic acid, dimer acid which is the reaction product of methacrylic acid and linolenic acid, trimer acid which is the reaction product of methacrylic acid and linolenic acid, dimer acid which is the reaction product of oleic acid and linolenic acid, trimer acid which is the reaction product of oleic acid and linolenic acid, dimer acid which is the reaction product of linoleic acid and linolenic acid, trimer acid which is the reaction product of linoleic acid and linolenic acid, hydrogenated dimer acid which is the hydrogenated product obtained by adding a hydrogen to each of the above-mentioned dimer acids, hydrogenated trimer acid which is the hydrogenated product obtained by adding a hydrogen to each of the above-mentioned trimer acid, and the like.

For example, dimer acid, which is the reaction product of oleic acid and linoleic acid, is a dimer having 36 carbon atoms. In addition, trimer acid, which is the reaction product of oleic acid and linoleic acid, is a trimer having 54 carbon atoms.

For the organic acid, one type may be used alone, or two or more types may be mixed and used.

As the organic acid contained in the flux according to the present embodiment, at least one selected from the group consisting of a monocarboxylic acid, a dicarboxylic acid, and a dimer acid is preferably used, at least one selected from the group consisting of a dicarboxylic acid and a dimer acid is more preferably used, at least one selected from the group consisting of an aliphatic dicarboxylic acid and a dimer acid is still more preferably used, and at least an aliphatic dicarboxylic acid is particularly preferably used.

In the flux according to the present embodiment, from the viewpoint of suppressing the generation of solder balls, it is preferable that the activator includes a dicarboxylic acid represented by General Formula (A0).

[Chemical Formula 2]

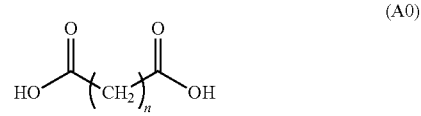

(A0)

[In the formula, n is an integer of 0 to 8.]

In Formula (A0), n is an integer of 0 to 8, preferably an integer of 2 to 6, more preferably an integer of 3 to 5, and still more preferably 4.

That is, as the aliphatic dicarboxylic acid, at least one selected from the group consisting of oxalic acid, malonic acid, succinic acid, glutaric acid, adipic acid, pimelic acid, suberic acid, azelaic acid, and sebacic acid is preferable, at least one selected from the group consisting of succinic acid, glutaric acid, adipic acid, pimelic acid, and suberic acid is more preferable, at least one selected from the group consisting of glutaric acid, adipic acid, and pimelic acid is still more preferable, and adipic acid is particularly preferable.

The total content of the organic acid in the flux according to the present embodiment is preferably 1% by mass to 25% by mass, more preferably 2% by mass to 20% by mass, and still more preferably 3% by mass to 20% by mass with respect to the total mass (100% by mass) of the flux.

The content of the dicarboxylic acid is preferably 1% by mass or more and 10% by mass or less, more preferably 1% by mass or more and 5% by mass or less, and still more preferably 2% by mass or more and 5% by mass or less with respect to the total mass (100% by mass) of the flux.

The content of the dimer acid (including a hydrogenated dimer acid) is preferably 2.5% by mass to 20% by mass, more preferably 5% by mass to 15% by mass, and still more preferably 7.5% by mass to 12.5% by mass with respect to the total mass (100% by mass) of the flux.

<<Amine>>

Examples of the amine include azoles, guanidines, alkylamine compounds, amino alcohol compounds, and the like.

Examples of the azoles include imidazole compounds such as 2-methylimidazole, 2-ethylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine isocyanuric acid adduct, 2,4-diamino-6-methacryloyloxyethyl-s-triazine, an epoxy-imidazole adduct, 2-methylbenzimidazole, 2-octylbenzimidazole, 2-pentylbenzimidazole, 2-(1-ethylpentyl) benzimidazole, 2-nonylbenzimidazole, 2-(4-thiazolyl) benzimidazole, and benzimidazole; triazole compounds such as 1,2,4-triazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl) benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl] benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 3-(N-salicyloyl)amino-1,2,4-triazole; 5-phenyltetrazole; and the like.

Examples of the guanidines include 1,3-diphenylguanidine, 1,3-di-o-tolylguanidine, 1-o-tolylbiguanide, 1,3-di-o-cumenylguanidine, 1,3-di-o-cumenyl-2-propionylguanidine, and the like.

Examples of the alkylamine compounds include ethylamine, triethylamine, ethylenediamine, triethylenetetramine, cyclohexylamine, hexadecylamine, stearylamine, and the like.

Examples of the amino alcohol compound include N,N,N',N'-tetrakis(2-hydroxypropyl)ethylenediamine, and the like.

For the amine, one type may be used alone, or two or more types may be mixed and used.

As the amine contained in the flux according to the present embodiment, at least one selected from the group consisting of azoles and guanidines is preferably used, and at least one selected from the group consisting of triazole compounds and guanidines is more preferably used.

In the flux according to the present embodiment, from the viewpoint of suppressing the generation of solder balls, the activator still more preferably includes a triazole compound.

The total content of the amines in the flux according to the present embodiment is preferably 0.5% by mass to 5% by mass, more preferably 1% by mass to 4.5% by mass, and still more preferably 2% by mass to 4% by mass with respect to the total mass (100% by mass) of the flux.

The content of the triazole compound is preferably more than 0% by mass and 0.99% by mass or less and more preferably 0.1% by mass or more and 0.5% by mass or less with respect to the total mass (100% by mass) of the flux.

The content of the guanidines is preferably 1% by mass or more and 5% by mass or less and more preferably 2% by mass or more and 4% by mass or less with respect to the total mass (100% by mass) of the flux.

In addition, in the flux according to the present embodiment, from the viewpoint of suppressing the generation of solder balls, it is also preferable to use an aliphatic dicarboxylic acid and a triazole compound in combination as the activator, and it is more preferable to use the dicarboxylic acid represented by General Formula (A0) and the triazole compound in combination. In a case where the aliphatic dicarboxylic acid and the triazole compound are used in combination, a mixing ratio (mass ratio) of the aliphatic dicarboxylic acid to the triazole compound, aliphatic dicarboxylic acid/triazole compound is preferably aliphatic dicarboxylic acid/triazole compound=90/10 or more and 95/5 or less.

<Other Components>

The flux according to the present embodiment may contain other components as necessary, in addition to the rosin, the solvent, the thixotropic agent, the amine hydroiodide, and the activator.

Examples of the other components include sulfur-containing compounds, resin components other than rosin, surfactants, antioxidants, metal inactivating agents, silane coupling agents, and the like.

<<Sulfur-Containing Compound>>

The flux according to the present embodiment may further contain a sulfur-containing compound. By further containing the sulfur-containing compound, the effect of suppressing the change in viscosity of the solder paste with time is easily enhanced.

Suitable examples of the sulfur-containing compound here include a thiol compound, and among these, more preferred examples thereof include a thiol compound (Tp) having a benzenethiol skeleton.

The "benzenethiol skeleton" refers to a structure in which one or more hydrogen atoms on a benzene ring are substituted with a mercapto group (—SH).

Regarding the Thiol Compound (Tp):

Suitable examples of the thiol compound (Tp) include a thiol compound represented by General Formula (Tp-0).

[Chemical Formula 3]

(Tp-0)

[In the formula, R is a substituent. x is an integer of 1 or more and represents the number of mercapto groups (—SH). y is an integer of 0 or more and represents the number of substituents (R). Provided that $1 \leq x+y \leq 6$.]

In Formula (Tp-0), examples of the substituent in R include an amino group (—$NH_2$), a halogen atom, an alkyl group, an alkoxy group, a halogenated alkyl group, a hydroxy group, and the like.

Examples of the halogen atoms include a fluorine atom, a chlorine atom, a bromine atom, and an iodine atom.

The alkyl group may be linear or branched, and an alkyl group having 1 to 6 carbon atoms is preferable.

As the alkoxy group, an alkoxy group having 1 to 6 carbon atoms is preferable.

Examples of the halogenated alkyl group include a group in which some or all of hydrogen atoms of an alkyl group are substituted with halogen atoms, the alkyl group may be linear or branched and is preferably an alkyl group having 1 to 6 carbon atoms, and examples of the halogen atom include a fluorine atom, a chlorine atom, a bromine atom, and an iodine atom.

Among these, the substituent in R is preferably an amino group or a hydroxy group, and particularly preferably an amino group, since the effect of suppressing a change in viscosity of the solder paste with time can be easily enhanced.

In Formula (Tp-0), x is an integer of 1 or more, preferably an integer of 1 to 3, more preferably 1 or 2, and particularly preferably 1.

y is an integer of 0 or more, preferably an integer of 0 to 3, more preferably an integer of 0 to 2, and particularly preferably 1.

Preferred examples of the thiol compound (Tp) include aminobenzenethiol represented by Chemical Formula (Tp-10).

[Chemical Formula 4]

(Tp-10)

In Chemical Formula (Tp-10), a bonding position of the amino group to the mercapto group on the benzene ring is may be any of an ortho position (2-), a meta position (3-), or a para position (4-).

For the thiol compound (Tp), one type may be used alone, or two or more types may be mixed and used.

As the tiol compound (Tp), the thiol compound represented by General Formula (Tp-0) is preferable, and from the viewpoint of easily enhancing the effect of suppressing a change in viscosity of the solder paste with time, aminobenzenethiol (x is 1 or more, y is 1 or more) or benzenethiol (x is 1 or more, y=0) is more preferable.

Among these, from the viewpoint of further enhancing the effect of suppressing the change in viscosity of the solder paste with time, a thiol compound selected from the group consisting of 2-aminobenzenethiol (x=y=1), 4-aminobenzenethiol (x=y=1), 3-aminobenzenethiol (x=y=1), and benzenethiol (x=1, y=0) is preferable, a thiol compound selected from the group consisting of 2-aninobenzenethiol (x=y=1), 4-aminobenzenethiol (x=y=1), and 3-aminobenzenethiol (x=y=1) is more preferable, a thiol compound selected from the group consisting of 2-aminobenzenethiol (x=y=1) and 4-aminobenzenethiol (x=y=1) is still more preferable, and it is particularly preferable to use 2-aminobenzenethiol (x=y=1) and 4-aminobenzenethiol (x=y=1) in combination.

In a case where 2-aminobenzenethiol (x=y=1) and 4-aminobenzenethiol (x=y=1) are used in combination, a mixing ratio (mass ratio) thereof, 2-aminobenzenethiol/4-aminobenzenethiol, is preferably 1/9 to 9/1, more preferably 3/7 to 7/3, and still more preferably 4/6 to 6/4.

In a case where the flux according to the present embodiment contains a thiol compound (Tp), the total content of the thiol compound (Tp) is preferably 0.005% by mass or more and 0.7% by mass or less, more preferably 0.01% by mass or more and 0.5% by mass or less, and still more preferably 0.02% by mass or more and 0.3% by mass or less with respect to the total mass (100% by mass) of the flux.

In a case where the total content of the thiol compound (Tp) is equal to or more than the lower limit value of the above-described preferred range, the effect of suppressing a change in viscosity of the solder paste with time is more easily enhanced, and in a case where the total content of the compound (Tp) is equal to or less than the upper limit value of the above-described preferred range, void generation during soldering is easily suppressed.

In a case where the flux according to the present embodiment contains the thiol compound (Tp) in addition to the above-described amine hydroiodide, the mixing ratio (mass ratio) of the thiol compound (Tp) to the amine hydroiodide salt, thiol compound (Tp)/amine hydroiodide is preferably more than 50/50 and 90/10 or less, more preferably 60/40 or more and 80/20 or less, and still more preferably 67/33 or more and 75/25 or less.

Regarding the Thiol Compound Other than the Compound (Tp):

As the thiol compound, a thiol compound other than the above-described compound (Tp) may be used.

Examples of the thiol compound other than the compound (Tp) include 2-(dibutylamino)-4,6-dimercapto-1,3,5-triazine, 2-mercaptobenzothiazole, tert-dodecanethiol, 2-ethylhexyl 3-mercaptopropionate, tridecyl 3-mercaptopropionate, and the like.

Regarding Sulfur-Containing Compounds Other than Thiol Compounds:

As the sulfur-containing compound, a sulfur-containing compound other than the thiol compound may be used.

Examples of the sulfur-containing compound other than the thiol compound include tetraethylthiuram disulfide, diisopropylxanthogen disulfide, dihexyl sulfide, diphenyl disulfide, 3-(2-benzothiazolylthio)propionic acid, and the like.

<<Resin Component Other than Rosin>>

Examples of the resin components other than rosin include a terpene resin, a modified terpene resin, a terpene phenol resin, a modified terpene phenol resin, a styrene resin, a modified styrene resin, a xylene resin, a modified xylene resin, an acrylic resin, a polyethylene resin, an acrylic-polyethylene copolymer resin, and an epoxy resin.

Examples of the modified terpene resin include an aromatic modified terpene resin, a hydrogenated terpene resin, and a hydrogenated aromatic modified terpene resin. Examples of the modified terpene phenol resin include a hydrogenated terpene phenol resin. Examples of the modified styrene resin include a styrene acrylic resin and a styrene maleic acid resin. Examples of the modified xylene resin include a phenol-modified xylene resin, an alkylphenol-modified xylene resin, a phenol-modified resol-type xylene resin, a polyol-modified xylene resin, and a polyoxyethylene-added xylene resin. Examples of the acrylic-polyethylene copolymer resin include an ethylene acrylic acid copolymer and the like.

<<Surfactant>>

Examples of the surfactant include a nonionic surfactant, a weak cationic surfactant, and the like.

Examples of the nonionic surfactants include polyethylene glycol, a polyethylene glycol-polypropylene glycol copolymer, an aliphatic alcohol polyoxyethylene adduct, an aromatic alcohol polyoxyethylene adduct, and a polyhydric alcohol polyoxyethylene adduct.

Examples of the weak cationic surfactants include diamine-terminated polyethylene glycol, a diamine-terminated polyethylene glycol-polypropylene glycol copolymer, an aliphatic amine polyoxyethylene adduct, an aromatic amine polyoxyethylene adduct, and a polyvalent amine polyoxyethylene adduct.

Examples of surfactants other than the above-mentioned examples include polyoxyalkylene acetylene glycol, polyoxyalkylene glyceryl ethers, polyoxyalkylene alkyl ethers, polyoxyalkylene esters, polyoxyalkylene alkylamines, and polyoxyalkylene alkylamides.

Since the flux according to the present embodiment described above contains a specific amine hydroiodide containing a heteroalicyclic amine hydroiodide, in a case of being used for a solder paste, the generation of voids during soldering can be further suppressed. The reason why such effect is obtained is not clear, but in the case of the heteroalicyclic amine hydroiodide, it is presumed that since the imino group (—N—) constitutes a part of the alicyclic ring, the imino group (—N—) faces the outside of the molecule, and thus the interaction with other flux components or solder alloys is high and the effect of soldering is relatively strong.

In the flux according to the present embodiment, preferably by further containing a sulfur-containing compound in addition to the specific amine hydroiodide containing a heteroalicyclic amine hydroiodide, the solder paste containing the flux is more likely to suppress the generation of voids during soldering, and the change in viscosity of the solder paste with time is also suppressed.

(Solder Paste)

A solder paste of the present embodiment contains a solder alloy powder and the above-mentioned flux.

The solder alloy powder may be constituted of an Sn-only solder powder; a powder of an Sn—Ag-based, Sn—Cu-based, Sn—Ag—Cu-based, Sn—Bi-based, or Sn—In-based solder alloy; or a powder of solder alloys in which Sb, Bi, In, Cu, Zn, As, Ag, Cd, Fe, Ni, Co, Au, Ge, P, or the like has been added to the above solder alloys.

In addition, the solder alloy powder may be constituted of a powder of an Sn—Pb-based solder alloy, or a powder of solder alloys in which Sb, Bi, In, Cu, Zn, As, Ag, Cd, Fe, Ni, Co, Au, Ge, P, or the like has been added to the Sn—Pb-based solder alloy.

The solder alloy powder is preferably a Pb-free solder.

As the solder alloy powder, for example, a solder alloy powder having a melting temperature of 150° C. to 250° C. can be used.

The content of the flux in the solder paste is preferably 5% to 30% by mass and more preferably 5% to 15% by mass with respect to the total mass of the solder paste.

In the solder paste according to the present embodiment described above, since a flux containing an amine hydroiodide is adopted, the generation of voids during soldering is suppressed.

In addition, in the solder paste according to the present embodiment, in a case of containing a flux in which a sulfur-containing compound is further used in combination, and more preferably in a case of containing a flux in which a specific thiol compound is further used in combination, the generation of voids during soldering is suppressed and the change in viscosity with time is also unlikely to occur.

EXAMPLES

Hereinafter, the present invention will be described with reference to Examples, but the present invention is not limited to the following Examples.

Preparation of Flux

Examples 1 to 60 and Comparative Examples 1 to 12

As shown in Tables 1 to 9, the formulation components were mixed to formulate each flux of Examples and Comparative Examples. The formulation components used are shown below.

Rosin:

An acrylic acid-modified hydrogenated rosin and a hydrogenated rosin were used as the rosin.

Solvent:

Diethylene glycol mono-2-ethylhexyl ether (boiling point of 272° C.) and diethylene glycol monohexyl ether (hexyl diglycol) (boiling point of 258° C.) were used as the solvent (S1) having a boiling point of 250° C. or higher.

The following solvent (S31) having a boiling point of 190° C. or higher and 220° C. or lower and a solvent (S32) having a boiling point of 160° C. or higher and lower than 190° C. were used as the solvent (S3) having a boiling point of 220° C. or lower.

Solvent (S31) having boiling point of 190° C. or higher and 220° C. or lower: 1,3-Butanediol (boiling point of 203° C.), 1,2-butanediol (boiling point of 194° C.), 2-methyl-2,4-pentanediol (hexylene glycol) (boiling point of 198° C.), ethylene glycol monohexyl ether (hexyl glycol) (boiling point of 208° C.), and α-terpineol (boiling point of 218° C.)

Solvent (S32) having boiling point of 160° C. or higher and lower than 190° C.: Ethylene glycol monobutyl ether (butyl glycol) (boiling point of 171° C.) and 2,3-butanediol (boiling point of 183° C.)

Thixotropic Agent:

Polyamide and hydrogenated castor oil were used as the thixotropic agent.

Amine Hydroiodide:

2-Pipecholine·HI and piperidine·HI were used as the heteroalicyclic amine hydroiodide.

As other amine hydroiodides, monoethylamine·HI, triethylamine·HI, aniline·HI, cyclohexylamine·HI, 1,3-diphenylguanidine·HI, diallylamine·HI, 1-pentanamine·HI, and 2-ethylhexylamine·HI were used.

2-Pipecholine·HI was produced by adding 30 g of a total amount of 2-pipecholine and hydrogen iodide in an equimolar ratio to 70 g of isopropyl alcohol (IPA), mixing these, then allowing the mixture to stand at room temperature (25° C.) for 5 minutes to precipitate, and drying the precipitate (yield of about 100%).

Piperidine·HI was produced by the same method as the method for producing 2-pipecholine·HI, except that 2-pipecholine was changed to piperidine (yield of about 100%).

As other amine hydroiodides, a ready-made product was used.

Sulfur-Containing Compound:

The following thiol compound (Tp) having a benzenethiol skeleton was used as the sulfur-containing compound.

Thiol Compound (Tp) Having Benzenethiol Skeleton:

2-Aminobenzenethiol and 4-aminobenzenethiol

Activator:

The following amine hydrobromides, amine hydrochlorides, organic acids, and amines were used as the activator.

2-Pipecholine·HBr, piperidine·HBr, and 1,3-diphenylguanidine·HBr were used as the amine hydrobromide.

1,3-Diphenylguanidine·HCl was used as the amine hydrochloride.

As the amine hydrobromide and the amine hydrochloride described above, ready-made products were used.

Organic Acid:

A hydrogenated dimer acid, adipic acid, benzoic acid, and phenylsuccinic acid were used as the organic acid.

Amine:

1,3-Di-o-tolylguanidine and 3-(N-salicyloyl)amino-1,2,4-triazole were used as the amine.

Other Components:

An ethylene acrylic acid copolymer was used as the acrylic resin. 2,2'-Methylenebis[6-(1-methylcyclohexyl)-β-cresol]was used as the antioxidant.

<Preparation of Solder Paste>

Each of the fluxes of each of the examples and the following solder alloy powders were mixed to blend solder pastes. In all the prepared solder pastes, the content of the flux was 11.5% by mass and the content of the solder alloy powder was 88.5% by mass, with respect to the total amount of the solder paste.

Solder Alloy Powder:

As the solder alloy powder, a powder consisting of a solder alloy in which Ag was 3% by mass, Cu was 0.5% by mass, and the remainder was Sn, was used. A solidus temperature of the solder alloy was 217° C., and a liquidus temperature was 220° C.

The size of the solder alloy powder was such that it satisfied the symbol 5 (particle size distribution) of the powder size classification (Table 2) in JIS Z 3284-1: 2004.

<Evaluation>

Using the solder paste prepared as described above, each of [effect of suppressing void generation] and [change in viscosity of solder paste with time] was evaluated according to the test methods described below.

[Effect of Suppressing Void Generation]

(1) Test Method

Using a metal mask (mask thickness of 0.12 mm), the solder paste of each example was printed on a Cu—OSP-treated board (board size of 105 mm×105 mm).

Next, a QFN (one side length of 8 mm, one side length of the lower electrode of 5.80 mm, and pad dimensions of 5.80 mm×5.80 mm) was mounted on the board on which the solder paste had been printed.

Next, reflow was performed to solder the components.

The reflow profile at that time is shown in FIG. 1.

In the reflow profile, preheating was performed by holding the temperature at 150° C. to 175° C. for 85 seconds, and the temperature was held at 220° C. or higher for 40 seconds, and the peak temperature was 242° C.

A void area was measured by irradiating the joined body of the board and the QFN with X-rays from a vertical direction of the board, and analyzing the transmitted X-rays. An XD 7600NT Diamond X-ray inspection system (manufactured by Nordson Corporation) was used for the measurement of the void area.

For the measurement of the void area, it was assumed that the void was present in a case where the X-rays passed through at least one void. As the voids, those having a diameter of 0.1 m or more were detected.

Next, the proportion of the total area of the voids to the total area of the lower electrode (area ratio of 100%) was calculated to obtain a void area ratio (%). The average value of the void area ratios in the five joined bodies was obtained, and the effect of suppressing void generation during soldering was evaluated according to the following evaluation criteria. The evaluation results are shown in Tables 1 to 9.

(2) Evaluation Criteria

1 Point: the void area ratio was less than 10%.

2 Points: the void area ratio was 10% or more and less than 15%.

3 Points: the void area ratio was 15% or more and less than 20%.

4 Points: the void area ratio was 20% or more and less than 30%.

5 Points: the void area ratio was 30% or more.

[Change in Viscosity of Solder Paste with Time]

(1) Test Method

Regarding the solder paste immediately after the preparation, the measurement of the viscosity was continued under the conditions of a rotation speed of 10 rpm, a temperature of 25° C., and 24 hours in the atmosphere using a viscometer (manufactured by Malcom Ltd., PCU-205). Then, a viscosity change rate after 24 hours was determined from the viscosity at the start point of the measurement and the viscosity after 24 hours in the solder paste, and the viscosity change of the solder paste with time was evaluated according to the following evaluation criteria. The evaluation results are shown in Tables 5 to 9.

(2) Evaluation Criteria

1 Point: the viscosity change rate after 24 hours was less than 10%.

2 Points: the viscosity change rate after 24 hours was 10% or more and less than 20%.

3 Points: the viscosity change rate after 24 hours was 20% or more and less than 30%.

4 Points: the viscosity change rate after 24 hours was 30% or more and less than 40%.

5 Points: the viscosity change rate after 24 hours was 40% or more and less than 50%.

6 Points: the viscosity change rate after 24 hours was 50% or more.

TABLE 1

| Flux material | | Name of formulation component | Example 1 | Example 2 | Example 3 | Example 4 | Example 5 | Example 6 | Example 7 | Example 8 |
|---|---|---|---|---|---|---|---|---|---|---|
| | Rosin | Acrylic acid-modified hydrogenated rosin | 33 | 33 | 33 | 33 | 33 | 33 | 33 | 33 |
| | | Hydrogenated rosin | | | | | | | | |
| Solvent | Solvent (S1) | Diethylene glycol mono-2-ethylhexyl ether | 30.69 | 30.6 | 29.8 | 29.2 | 30.69 | 30.6 | 29.8 | 29.2 |
| | | Diethylene glycol monohexyl ether (hexyl diglycol) | | | | | | | | |
| | Solvent (S31) | 1,3-Butanediol | 10 | 10 | 10 | 10 | 10 | 10 | 10 | 10 |
| | | 1,2-Butanediol | | | | | | | | |
| | | 2-Methyl-2,4-pentanediol (hexylene glycol) | | | | | | | | |
| | | Ethylene glycol monohexyl ether (hexyl glycol) | | | | | | | | |
| | | α-Terpineol | | | | | | | | |
| Thixotropic agent | | Polyamide | 4 | 4 | 4 | 4 | 4 | 4 | 4 | 4 |
| | | Hydrogenated castor oil | 3 | 3 | 3 | 3 | 3 | 3 | 3 | 3 |
| Heteroalicyclic amine hydroiodide | | 2-Pipecholine•HI | 0.01 | 0.1 | 0.9 | 1.5 | | | | |
| | | Piperidine•HI | | | | | 0.01 | 0.1 | 0.9 | 1.5 |
| Activator | Organic acid | Hydrogenated dimer acid | 10 | 10 | 10 | 10 | 10 | 10 | 10 | 10 |
| | | Adipic acid | 3 | 3 | 3 | 3 | 3 | 3 | 3 | 3 |
| | | Benzoic acid | 0.1 | 0.1 | 0.1 | 0.1 | 0.1 | 0.1 | 0.1 | 0.1 |
| | | Phenylsuccinic acid | | | | | | | | |
| | Amine | 1,3-Di-o-tolylguanidine | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 |
| Other | Acrylic resin | Ethylene acrylic acid copolymer | | | | | | | | |
| | Antioxidant | 2,2'-Methylenebis|6-(1-methylcyclohexyl)-p-cresol| | 3 | 3 | 3 | 3 | 3 | 3 | 3 | 3 |
| | Total | | 100.000 | 100.000 | 100.000 | 100.000 | 100.000 | 100.000 | 100.000 | 100.000 |
| Evaluation | | Effect of suppressing void generation | 2 | 2 | 2 | 1 | 2 | 2 | 2 | 1 |

TABLE 2

| Flux material | | Name of formulation component | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| | Rosin | Acrylic acid-modified hydrogenated rosin | 33 | 33 | 33 | 33 | 33 | 33 | 33 | 33 | 33 | 33 |
| | | Hydrogenated rosin | | | | | | | | | | |
| Solvent | Solvent (S1) | Diethylene glycol mono-2-ethylhexyl ether | 33.1 | 25.6 | 20.6 | | 30.6 | 30.6 | 30.6 | 30.6 | 30.6 | 30.6 |
| | | Diethylene glycol monohexyl ether (hexyl diglycol) | | | | 30.6 | | | | | | |
| | Solvent (S31) | 1,3-Butanediol | 7.5 | 15 | 20 | 10 | | | | | | |
| | | 1,2-Butanediol | | | | | 10 | | | | | |
| | | 2-Methyl-2,4-pentanediol (hexylene glycol) | | | | | | 10 | | | | |
| | | Ethylene glycol monohexyl ether (hexyl glycol) | | | | | | | 10 | | | |
| | | α-Terpineol | | | | | | | | 10 | | |
| | Solvent (S32) | Ethylene glycol monobutyl ether (butyl glycol) | | | | | | | | | 10 | |
| | | 2,3-Butanediol | | | | | | | | | | 10 |
| Thixotropic agent | | Polyamide | 4 | 4 | 4 | 4 | 4 | 4 | 4 | 4 | 4 | 4 |
| | | Hydrogenated castor oil | 3 | 3 | 3 | 3 | 3 | 3 | 3 | 3 | 3 | 3 |

TABLE 2-continued

| Flux material | | Name of formulation component | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| | Heteroalicyclic amine hydroiodide | 2-Pipecholine•HI | 0.1 | 0.1 | 0.1 | 0.1 | 0.1 | 0.1 | 0.1 | 0.1 | 0.1 | 0.1 |
| | | Piperidine•HI | | | | | | | | | | |
| Activator | Organic acid | Hydrogenated dimer acid | 10 | 10 | 10 | 10 | 10 | 10 | 10 | 10 | 10 | 10 |
| | | Adipic acid | 3 | 3 | 3 | 3 | 3 | 3 | 3 | 3 | 3 | 3 |
| | | Benzoic acid | 0.1 | 0.1 | 0.1 | 0.1 | 0.1 | 0.1 | 0.1 | 0.1 | 0.1 | 0.1 |
| | | Phenylsuccinic acid | | | | | | | | | | |
| | Amine | 1,3-Di-o-tolylguanidine | 3 | 3 | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 | 0.2 | 0.2 |
| Other | Acrylic resin | Ethylene acrylic acid copolymer | | | | | | | | | | |
| | Antioxidant | 2,2'-Methylenebis[6-(1-methylcyclohexyl)-p-cresol] | 3 | 3 | 3 | 3 | 3 | 3 | 3 | 3 | 3 | 3 |
| | | Total | 100.000 | 100.000 | 100.000 | 100.000 | 100.000 | 100.000 | 100.000 | 100.000 | 100.000 | 100.000 |
| Evaluation | | Effect of suppressing void generation | 2 | 2 | 1 | 2 | 2 | 2 | 2 | 2 | 1 | 1 |

TABLE 3

| Flux material | | Name of formulation component | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| | Rosin | Acrylic acid-modified hydrogenated rosin | 33 | 33 | 33 | 33 | 33 | 33 | 33 | 33 |
| | | Hydrogenated rosin | | | | | | | | |
| Solvent | Solvent (S1) | Diethylene glycol mono-2-ethylhexyl ether | 30.6 | 30.6 | 30.6 | 30.6 | 30.6 | 30.6 | 30.6 | 30.6 |
| | | Diethylene glycol monohexyl ether (hexyl diglycol) | | | | | | | | |
| | Solvent (S31) | 1,3-Butanediol | 10 | 10 | 10 | 10 | 10 | 10 | 10 | 10 |
| | | 1,2-Butanediol | | | | | | | | |
| | | 2-Methyl-2,4-pentanediol (hexylene glycol) | | | | | | | | |
| | | Ethylene glycol monohexyl ether (hexyl glycol) | | | | | | | | |
| | | α-Terpineol | | | | | | | | |
| Thixotropic agent | | Polyamide | 4 | 4 | 4 | 4 | 4 | 4 | 4 | 4 |
| | | Hydrogenated castor oil | 3 | 3 | 3 | 3 | 3 | 3 | 3 | 3 |
| | Heteroalicyclic amine hydroiodide | 2-Pipecholine•HI | | | | | | | | |
| | | Piperidine•HI | | | | | | | | |
| | Other heteroalicyclic amine hydroiodides | Monoethylamine•HI | 0.1 | | | | | | | |
| | | Triethylamine•HI | | 0.1 | | | | | | |
| | | Aniline•HI | | | 0.1 | | | | | |
| | | Cyclohexylamine•HI | | | | 0.1 | | | | |
| | | 1,3-Diphenyl-guanidine•HI | | | | | 0.1 | | | |
| | | Diallylamine•HI | | | | | | 0.1 | | |
| | | 1-Pentaneamine•HI | | | | | | | 0.1 | |
| | | 2-Ethylhexylamine•HI | | | | | | | | 0.1 |
| Activator | Amine hydrobromide | 2-Pipecholine•HBr | | | | | | | | |
| | | Piperidine•HBr | | | | | | | | |
| | | 1,3-Diphenyl-guanidine•HBr | | | | | | | | |

TABLE 3-continued

| Flux material | | Name of formulation component | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| | Amine hydrochloride | 1,3-Diphenyl-guanidine•HCl | | | | | | | | |
| | Organic acid | Hydrogenated dimer acid | 10 | 10 | 10 | 10 | 10 | 10 | 10 | 10 |
| | | Adipic acid | 3 | 3 | 3 | 3 | 3 | 3 | 3 | 3 |
| | | Benzoic acid | 0.1 | 0.1 | 0.1 | 0.1 | 0.1 | 0.1 | 0.1 | 0.1 |
| | | Phenylsuccinic acid | | | | | | | | |
| | Amine | 1,3-Di-o-tolylguanidine | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 |
| Other | Acrylic resin | Ethylene acrylic acid copolymer | | | | | | | | |
| | Antioxidant | 2,2'-Methylenebis[6-(1-methylcyclohexyl)-p-cresol] | 3 | 3 | 3 | 3 | 3 | 3 | 3 | 3 |
| | Total | | 100.000 | 100.000 | 100.000 | 100.000 | 100.000 | 100.000 | 100.000 | 100.000 |
| Evaluation | | Effect of suppressing void generation | 3 | 3 | 3 | 3 | 3 | 3 | 3 | 3 |

TABLE 4

| Flux material | | Name of formulation component | Comparative Example 9 | Comparative Example 10 | Comparative Example 11 | Comparative Example 12 |
|---|---|---|---|---|---|---|
| | Rosin | Acrylic acid-modified hydrogenated rosin | 33 | 33 | 33 | 33 |
| | | Hydrogenated rosin | | | | |
| Solvent | Solvent (S1) | Diethylene glycol mono-2-ethylhexyl ether | 30.6 | 30.6 | 30.6 | 30.6 |
| | | Diethylene glycol monohexyl ether (hexyl diglycol) | | | | |
| | Solvent (S31) | 1,3-Butanediol | 10 | 10 | 10 | 10 |
| | | 1,2-Butanediol | | | | |
| | | 2-Methyl-2,4-pentanediol (hexylene glycol) | | | | |
| | | Ethylene glycol monohexyl ether (hexyl glycol) | | | | |
| | | α-Terpineol | | | | |
| | Thixotropic agent | Polyamide | 4 | 4 | 4 | 4 |
| | | Hydrogenated castor oil | 3 | 3 | 3 | 3 |
| | Heteroalicyclic amine hydroiodide | 2-Pipecholine•HI | | | | |
| | | Piperidine•HI | | | | |
| | Other heteroalicyclic amine hydroiodides | Monoethylamine•HI | | | | |
| | | Triethylamine•HI | | | | |
| | | Aniline•HI | | | | |
| | | Cyclohexylamine•HI | | | | |
| | | 1,3-Diphenylguanidine•HI | | | | |
| | | Diallylamine•HI | | | | |
| | | 1-Pentaneamine•HI | | | | |
| | | 2-Ethylhexylamine•HI | | | | |
| Activator | Amine hydrobromide | 2-Pipecholine•HBr | 0.1 | | | |
| | | Piperidine•HBr | | 0.1 | | |
| | | 1,3-Diphenylguanidine•HBr | | | 0.1 | |
| | Amine hydrochloride | 1,3-Diphenylguanidine•HCl | | | | 0.1 |
| | Organic acid | Hydrogenated dimer acid | 10 | 10 | 10 | 10 |
| | | Adipic acid | 3 | 3 | 3 | 3 |
| | | Benzoic acid | 0.1 | 0.1 | 0.1 | 0.1 |
| | | Phenylsuccinic acid | | | | |

TABLE 4-continued

| Flux material | | Name of formulation component | Comparative Example 9 | Comparative Example 10 | Comparative Example 11 | Comparative Example 12 |
|---|---|---|---|---|---|---|
| | Amine | 1,3-Di-o-tolylguanidine | 3 | 3 | 3 | 3 |
| | | 3-(N-Salicyloyl)amino-1,2,4-triazole | 0.2 | 0.2 | 0.2 | 0.2 |
| Other | Acrylic resin | Ethylene acrylic acid copolymer | | | | |
| | Antioxidant | 2,2'-Methylenebis[6-(1-methylcyclohexyl)-p-cresol] | 3 | 3 | 3 | 3 |
| | Total | | 100.000 | 100.000 | 100.000 | 100.000 |
| Evaluation | | Effect of suppressing void generation | 5 | 5 | 5 | 5 |

From the results shown in Tables 1 to 4, it can be confirmed that the flux of Examples containing a heteroalicyclic amine hydroiodide has a lower void area ratio and a higher effect of suppressing the void generation during soldering, as compared with the flux of Comparative Examples containing an amine hydrohalide salt that does not correspond to a heteroalicyclic amine hydroiodide (comparison between Examples 2 and 6 and Comparative Examples to 12).

TABLE 5

| Flux material | | Name of formulation component | Example 2 | Example 6 | Example 19 | Example 20 | Example 21 | Example 22 |
|---|---|---|---|---|---|---|---|---|
| | Rosin | Acrylic acid-modified hydrogenated rosin | 33 | 33 | 33 | 33 | 33 | 33 |
| | | Hydrogenated rosin | | | | | | |
| Solvent | Solvent (S1) | Diethylene glycol mono-2-ethylhexyl ether | 30.6 | 30.6 | 30.3 | 30.3 | 30.3 | 30.3 |
| | | Diethylene glycol monohexyl ether (hexyl diglycol) | | | | | | |
| | Solvent (S31) | 1,3-Butanediol | 10 | 10 | 10 | 10 | 10 | 10 |
| | | 1,2-Butanediol | | | | | | |
| | | 2-Methyl-2,4-pentanediol (hexylene glycol) | | | | | | |
| | | Ethylene glycol monohexyl ether (hexyl glycol) | | | | | | |
| | | α-Terpineol | | | | | | |
| Thixotropic agent | | Polyamide | 4 | 4 | 4 | 4 | 4 | 4 |
| | | Hydrogenated castor oil | 3 | 3 | 3 | 3 | 3 | 3 |
| Heteroalicyclic amine hydroiodide | | 2-Pipecholine·HI | 0.1 | | 0.1 | 0.1 | 0.1 | |
| | | Piperidine·HI | | 0.1 | | | | 0.1 |
| Sulfur-containing compound | Thiol compound (Tp) | 2-Aminobenzenethiol | | | 0.3 | | 0.15 | 0.15 |
| | | 4-Aminobenzenethiol | | | | 0.3 | 0.15 | 0.15 |
| Activator | Organic acid | Hydrogenated dimer acid | 10 | 10 | 10 | 10 | 10 | 10 |
| | | Adipic acid | 3 | 3 | 3 | 3 | 3 | 3 |
| | | Benzoic acid | 0.1 | 0.1 | 0.1 | 0.1 | 0.1 | 0.1 |
| | | Phenylsuccinic acid | | | | | | |
| | Amine | 1,3-Di-o-tolylguanidine | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 |
| Other | Acrylic resin | Ethylene acrylic acid copolymer | | | | | | |
| | Antioxidant | 2,2'-Methylenebis[6-(1-methylcyclohexyl)-p-cresol] | 3 | 3 | 3 | 3 | 3 | 3 |
| | Total | | 100.000 | 100.000 | 100.000 | 100.000 | 100.000 | 100.000 |
| Evaluation | | Effect of suppressing void generation | 2 | 2 | 1 | 1 | 1 | 1 |
| | | Change in viscosity of solder paste with time | 5 | 5 | 2 | 2 | 1 | 1 |

From the results shown in Table 5, it can be confirmed that in a case where the thiol compound (Tp) is further contained, the generation of voids during soldering is suppressed and the change in viscosity with time in a case of being made into a solder paste is less likely to occur.

TABLE 6

| Flux material | | Name of formulation component | Example 23 | Example 24 | Example 25 | Example 26 | Example 27 | Example 28 | Example 29 | Example 30 | Example 31 | Example 32 |
|---|---|---|---|---|---|---|---|---|---|---|---|---|
| | Rosin | Acrylic acid-modified hydrogenated rosin | 20 | 20 | 20 | 20 | 20 | 25 | 25 | 25 | 25 | 25 |
| | | Hydrogenated rosin | | | | | | | | | | |
| Solvent | Solvent (S1) | Diethylene glycol mono-2-ethylhexyl ether | 55 | 60 | 45 | 50 | 55 | 50 | 55 | 40 | 45 | 50 |
| | | Diethylene glycol monohexyl ether (hexyl diglycol) | | | | | | | | | | |
| | Solvent (S31) | 1,3-Butanediol | | | | | | | | | | |
| | | 1,2-Butanediol | | | | | | | | | | |
| | | 2-Methyl-2,4-pentanediol (hexylene glycol) | | | | | | | | | | |
| | | Ethylene glycol monohexyl ether (hexyl glycol) | | | | | | | | | | |
| | | α-Terpincol | | | | | | | | | | |
| Thixotropic agent | | Polyamide | 10 | 10 | 10 | 10 | 10 | 8 | 8 | 8 | 8 | 8 |
| | | Hydrogenated castor oil | 5 | | | | | 7 | 2 | 2 | 2 | 2 |
| Heteroalicyclic amine hydroiodide | | 2-Pipecholine•HI | 0.1 | 0.1 | 0.1 | 0.1 | 0.1 | 0.1 | 0.1 | 0.1 | 0.1 | 0.1 |
| | | Piperidine•HI | | | | | | | | | | |
| Sulfur-containing compound | Thiol compound (Tp) | 2-Aminobenzenethiol | 0.1 | 0.1 | 0.1 | 0.1 | 0.1 | 0.1 | 0.1 | 0.1 | 0.1 | 0.1 |
| | | 4-Aminobenzenethiol | 0.1 | 0.1 | 0.1 | 0.1 | 0.1 | 0.1 | 0.1 | 0.1 | 0.1 | 0.1 |
| Activator | Organic acid | Hydrogenated dimer acid | | | 15 | 10 | 5 | | | 15 | 10 | 5 |
| | | Adipic acid | 3.5 | 3.5 | 3.5 | 3.5 | 3.5 | 3.5 | 3.5 | 3.5 | 3.5 | 3.5 |
| | | Benzoic acid | | | | | | | | | | |
| | | Phenylsuccinic acid | | | | | | | | | | |
| | Amine | 1,3-Di-o-tolylguanidine | 3 | 3 | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 | 0.2 | 0.2 |
| Other | Acrylic resin | Ethylene acrylic acid copolymer | | | | | | | | | | |
| | Antioxidant | 2,2'-Methylenebis[6-(1-methylcyclohexyl)-p-cresol] | 3 | 3 | 3 | 3 | 3 | 3 | 3 | 3 | 3 | 3 |
| | | Total | 100.0002 | 100.0002 | 100.0002 | 100.0002 | 100.0002 | 100.0002 | 100.0002 | 100.0002 | 100.0002 | 100.0002 |
| Evaluation | | Effect of suppressing void generation | 2 | 2 | 2 | 2 | 2 | 2 | 2 | 2 | 2 | 2 |
| | | Change in viscosity of solder paste with time | 1 | 1 | 1 | 1 | 1 | 1 | 1 | 1 | 1 | 1 |

TABLE 7

| Flux material | | Name of formulation component | Example 33 | Example 34 | Example 35 | Example 36 | Example 37 | Example 38 | Example 39 | Example 40 | Example 41 | Example 42 | Example 43 |
|---|---|---|---|---|---|---|---|---|---|---|---|---|---|
| | Rosin | Acrylic acid-modified hydrogenated rosin | 30 | 30 | 30 | 30 | 30 | 33 | 33 | 33 | 33 | 23 | 23 |
| | | Hydrogenated rosin | | | | | | | | | | | 10 |

TABLE 7-continued

| Flux material | | Name of formulation component | Example 33 | Example 34 | Example 35 | Example 36 | Example 37 | Example 38 | Example 39 | Example 40 | Example 41 | Example 42 | Example 43 |
|---|---|---|---|---|---|---|---|---|---|---|---|---|---|
| Solvent | Solvent (S1) | Diethylene glycol mono-2-ethyl-hexyl ether | 45 | 50 | 35 | 40 | 45 | 30.4 | 29.6 | 30.4 | 29.6 | 30.4 | 30.4 |
| | | Diethylene glycol monohexyl ether (hexyl diglycol) | | | | | | | | | | | |
| | Solvent (S31) | 1,3-Butanediol | | | | | | 10 | 10 | 10 | 10 | 10 | 10 |
| | | 1,2-Butanediol | | | | | | | | | | | |
| | | 2-Methyl-2,4-pentanediol (hexylene glycol) | | | | | | | | | | | |
| | | Ethylene glycol monohexyl ether (hexyl glycol) | | | | | | | | | | | |
| | | α-Terpineol | | | | | | | | | | | |
| Thixotropic agent | | Polyamide | 6 | 6 | 6 | 6 | 6 | 4 | 4 | 4 | 4 | 4 | 4 |
| | | Hydrogenated castor oil | 9 | 4 | 4 | 4 | 4 | 3 | 3 | 3 | 3 | 3 | 3 |
| Heteroalicyclic amine hydroiodide | | 2-Pipecholine•HI | 0.1 | 0.1 | 0.1 | 0.1 | 0.1 | 0.1 | 0.1 | 0.1 | 0.1 | 0.1 | 0.1 |
| | | Piperidine•HI | | | | | | | | | | | |
| Sulfur-containing compound | Thiol compound (Tp) | 2-Aminobenzenethiol | 0.1 | 0.1 | 0.1 | 0.1 | 0.1 | 0.1 | 0.1 | 0.1 | 0.1 | 0.1 | 0.1 |
| | | 4-Aminobenzenethiol | 0.1 | 0.1 | 0.1 | 0.1 | 0.1 | 0.1 | 0.1 | 0.1 | 0.1 | 0.1 | 0.1 |
| Activator | Organic acid | Hydrogenated dimer acid | | | 15 | 10 | 5 | 10 | 10 | 10 | 10 | 10 | 10 |
| | | Adipic acid | 3.5 | 3.5 | 3.5 | 3.5 | 3.5 | 3 | 3 | 3 | 3 | 3 | 3 |
| | | Benzoic acid | | | | | | 0.1 | 0.9 | | | 0.1 | 0.1 |
| | | Phenylsuccinic acid | | | | | | | | 0.1 | 0.9 | | |
| | Amine | 1,3-Di-o-tolylguanidine | 3 | 3 | 3 | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 | 0.2 | 0.2 | 0.2 |
| Other | Acrylic resin | Ethylene acrylic acid copolymer | | | | | | | | | | | 10 |
| | Antioxidant | 2,2'-Methylenebis[6-(1-methyl-cyclohexyl)-p-cresol | 3 | 3 | 3 | 3 | 3 | 3 | 3 | 3 | 3 | 3 | 3 |
| Total | | | 100.000 | 100.000 | 100.000 | 100.000 | 100.000 | 100.000 | 100.000 | 100.000 | 100.000 | 100.000 | 100.000 |
| Evaluation | | Effect of suppressing void generation | 2 | 2 | 2 | 2 | 2 | 1 | 1 | 1 | 1 | 1 | 1 |
| | | Change in viscosity of solder paste with time | 1 | 1 | 1 | 1 | 1 | 1 | 1 | 1 | 1 | 1 | 1 |

TABLE 8

| Flux material | | Name of formulation component | Example 44 | Example 45 | Example 46 | Example 47 | Example 48 | Example 49 | Example 50 | Example 51 | Example 52 | Example 53 | Example 54 |
|---|---|---|---|---|---|---|---|---|---|---|---|---|---|
| Rosin | | Acrylic acid-modified hydrogenated rosin | 35 | 35 | 35 | 35 | 35 | 35 | 40 | 40 | 40 | 40 | 40 |
| | | Hydrogenated rosin | | | | | | | | | | | |
| Solvent | Solvent (S1) | Diethylene glycol mono-2-ethyl-hexyl ether | 40 | 45 | 50 | 30 | 35 | 40 | 35 | 40 | 45 | 30 | 35 |
| | | Diethylene glycol monohexyl ether (hexyl diglycol) | | | | | | | | | | | |

TABLE 8-continued

| Flux material | | Name of formulation component | Example 44 | Example 45 | Example 46 | Example 47 | Example 48 | Example 49 | Example 50 | Example 51 | Example 52 | Example 53 | Example 54 |
|---|---|---|---|---|---|---|---|---|---|---|---|---|---|
| | Solvent (S31) | 1,3-Butanediol | | | | | | | | | | | |
| | | 1,2-Butanediol | | | | | | | | | | | |
| | | 2-Methyl-2,4-pentanediol (hexylene glycol) | | | | | | | | | | | |
| | | Ethylene glycol monohexyl ether (hexyl glycol) | | | | | | | | | | | |
| | | α-Terpineol | | | | | | | | | | | |
| | Thixotropic agent | Polyamide | 5 | 5 | 5 | 5 | 5 | 5 | 3 | 3 | 3 | 3 | 3 |
| | | Hydrogenated castor oil | 10 | 5 | | 5 | 5 | 5 | 12 | 7 | 2 | 7 | 7 |
| | Heteroalicyclic amine hydroiodide | 2-Pipecholine•HI | 0.1 | 0.1 | 0.1 | 0.1 | 0.1 | 0.1 | 0.1 | 0.1 | 0.1 | 0.1 | 0.1 |
| | | Piperidine•HI | | | | | | | | | | | |
| Sulfur-containing compound | Thiol compound (Tp) | 2-Aminobenzenethiol | 0.1 | 0.1 | 0.1 | 0.1 | 0.1 | 0.1 | 0.1 | 0.1 | 0.1 | 0.1 | 0.1 |
| | | 4-Aminobenzenethiol | 0.1 | 0.1 | 0.1 | 0.1 | 0.1 | 0.1 | 0.1 | 0.1 | 0.1 | 0.1 | 0.1 |
| Activator | Organic acid | Hydrogenated dimer acid | | | | 15 | 10 | 5 | | | | 10 | 5 |
| | | Adipic acid | 3.5 | 3.5 | 3.5 | 3.5 | 3.5 | 3.5 | 3.5 | 3.5 | 3.5 | 3.5 | 3.5 |
| | | Benzoic acid | | | | | | | | | | | |
| | | Phenylsuccinic acid | | | | | | | | | | | |
| | Amine | 1,3-Di-o-tolylguanidine | 3 | 3 | 3 | 3 | 3 | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 | 0.2 | 0.2 | 0.2 | 0.2 | 0.2 |
| Other | Acrylic resin | Ethylene acrylic acid copolymer | | | | | | | | | | | |
| | Antioxidant | 2,2'-Methylenebis[6-(1-methylcyclohexyl)-p-cresol] | 3 | 3 | 3 | 3 | 3 | 3 | 3 | 3 | 3 | 3 | 3 |
| Total | | | 100.000 | 100.000 | 100.000 | 100.000 | 100.000 | 100.000 | 100.000 | 100.000 | 100.000 | 100.000 | 100.000 |
| Evaluation | | Effect of suppressing void generation | 2 | 2 | 2 | 2 | 2 | 2 | 2 | 2 | 2 | 2 | 2 |
| | | Change in viscosity of solder paste with time | 1 | 1 | 1 | 1 | 1 | 1 | 1 | 1 | 1 | 1 | 1 |

TABLE 9

| Flux material | | Name of formulation component | Example 55 | Example 56 | Example 57 | Example 58 | Example 59 | Example 60 |
|---|---|---|---|---|---|---|---|---|
| | Rosin | Acrylic acid-modified hydrogenated rosin | 45 | 45 | 45 | 45 | 50 | 50 |
| | | Hydrogenated rosin | | | | | | |
| Solvent | Solvent (S1) | Diethylene glycol mono-2-ethylhexyl ether | 30 | 35 | 40 | 30 | 30 | 35 |
| | | Diethylene glycol monohexyl ether (hexyl diglycol) | | | | | | |
| | Solvent (S31) | 1,3-Butanediol | | | | | | |
| | | 1,2-Butanediol | | | | | | |
| | | 2-Methyl-2,4-pentanediol (hexylene glycol) | | | | | | |
| | | Ethylene glycol monohexyl ether (hexyl glycol) | | | | | | |
| | | α-Terpineol | | | | | | |

TABLE 9-continued

| Flux material | | Name of formulation component | Example 55 | Example 56 | Example 57 | Example 58 | Example 59 | Example 60 |
|---|---|---|---|---|---|---|---|---|
| Thixotropic agent | | Polyamide | 3 | 3 | 3 | 3 | 3 | 3 |
| | | Hydrogenated castor oil | 12 | 7 | 2 | 7 | 7 | 2 |
| Heteroalicyclic amine hydroiodide | | 2-Pipecholine•HI Piperidine•HI | 0.1 | 0.1 | 0.1 | 0.1 | 0.1 | 0.1 |
| Sulfur-containing compound | Thiol compound (Tp) | 2-Aminobenzenethiol | 0.1 | 0.1 | 0.1 | 0.1 | 0.1 | 0.1 |
| | | 4-Aminobenzenethiol | 0.1 | 0.1 | 0.1 | 0.1 | 0.1 | 0.1 |
| Activator | Organic acid | Hydrogenated dimer acid | | | | 5 | | |
| | | Adipic acid | 3.5 | 3.5 | 3.5 | 3.5 | 3.5 | 3.5 |
| | | Benzoic acid | | | | | | |
| | | Phenylsuccinic acid | | | | | | |
| | Amine | 1,3-Di-o-tolylguanidine | 3 | 3 | 3 | 3 | 3 | 3 |
| | | 3-(N-Salicyloyl)amino-1,2,4-triazole | 0.2 | 0.2 | 0.2 | 0.2 | 0.2 | 0.2 |
| Other | Acrylic resin | Ethylene acrylic acid copolymer | | | | | | |
| | Antioxidant | 2,2'-Methylenebis[6-(1-methylcyclohexyl)-p-cresol] | 3 | 3 | 3 | 3 | 3 | 3 |
| | | Total | 100.000 | 100.000 | 100.000 | 100.000 | 100.000 | 100.000 |
| Evaluation | | Effect of suppressing void generation | 2 | 2 | 2 | 2 | 2 | 2 |
| | | Change in viscosity of solder paste with time | 1 | 1 | 1 | 1 | 1 | 1 |

From the results shown in Tables 6 to 9, it can be confirmed that in all case of using the fluxes of Examples 23 to 60 in which the heteroalicyclic amine hydroiodide and the thiol compound (Tp) are used in combination, the generation of voids during soldering is suppressed, and the change in viscosity over time in a case of being made into a solder paste is also unlikely to occur.

Hereinabove, preferable examples of the present invention have been described above, but the present invention is not limited to these examples. Additions, omissions, substitutions, and other modifications can be made without departing from the scope of the present invention. The present invention is not limited by the description above, but is limited only by the appended claims.

The invention claimed is:

1. A flux comprising:
rosin;
a solvent;
a thixotropic agent;
at least one first activator selected from the group consisting of a piperidine hydroiodide and a pipecholine hydroiodide, wherein a content of the first activator is 0.01% by mass or more and 1.5% by mass or less with respect to a total mass (100% by mass) of the flux; and
a second activator other than a piperidine hydroiodide and a pipecholine hydroiodide,
wherein an average void area ratio of the flux is less than 15%.

2. A flux comprising:
rosin;
a solvent;
a thixotropic agent;
at least one first activator selected from the group consisting of a piperidine hydroiodide and a pipecholine hydroiodide,
wherein a content of the first activator is 0.01% by mass or more and 1.5% by mass or less with respect to a total mass (100% by mass) of the flux; and
a second activator other than a piperidine hydroiodide and a pipecholine hydroiodide,
wherein the second activator includes a compound (Tp) having a benzenethiol skeleton in which one or more hydrogen atoms on a benzene ring are substituted with a mercapto group (—SH).

3. The flux according to claim 1,
wherein as the solvent, a solvent (S1) having a boiling point of 250° C. or higher and a solvent (S3) having a boiling point of 220° C. or lower are used in combination.

4. The flux according to claim 1, further comprising:
a thiol compound.

5. The flux according to claim 1,
wherein the second activator includes a dicarboxylic acid represented by General Formula (A0),

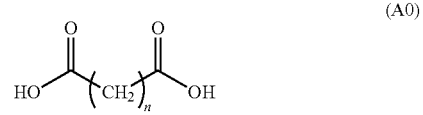

(A0)

in the formula, n is an integer of 0 to 8.

6. The flux according to claim 1,
wherein the second activator includes a triazole compound.

7. A solder paste comprising:
a solder alloy powder; and
the flux according to claim 1.

8. The flux according to claim 3,
wherein a ratio of the solvent (S1) to the solvent (S3) is 50/50 or more and 85/15 or less in a mass ratio represented by solvent (S1)/solvent (S3).

9. The flux according to claim 2,
wherein the compound (Tp) is at least one thiol compound selected from the group consisting of 2-aminobenzenethiol, 4-aminobenzenethiol, 3-aminobenzenethiol, and benzenethiol.

10. A solder paste comprising:
a solder alloy powder; and
the flux according to claim 2.

* * * * *